No. 727,567. PATENTED MAY 12, 1903.
V. G. APPLE.
ELECTRIC SWITCH.
APPLICATION FILED JUNE 16, 1902.
NO MODEL. 3 SHEETS—SHEET 1.
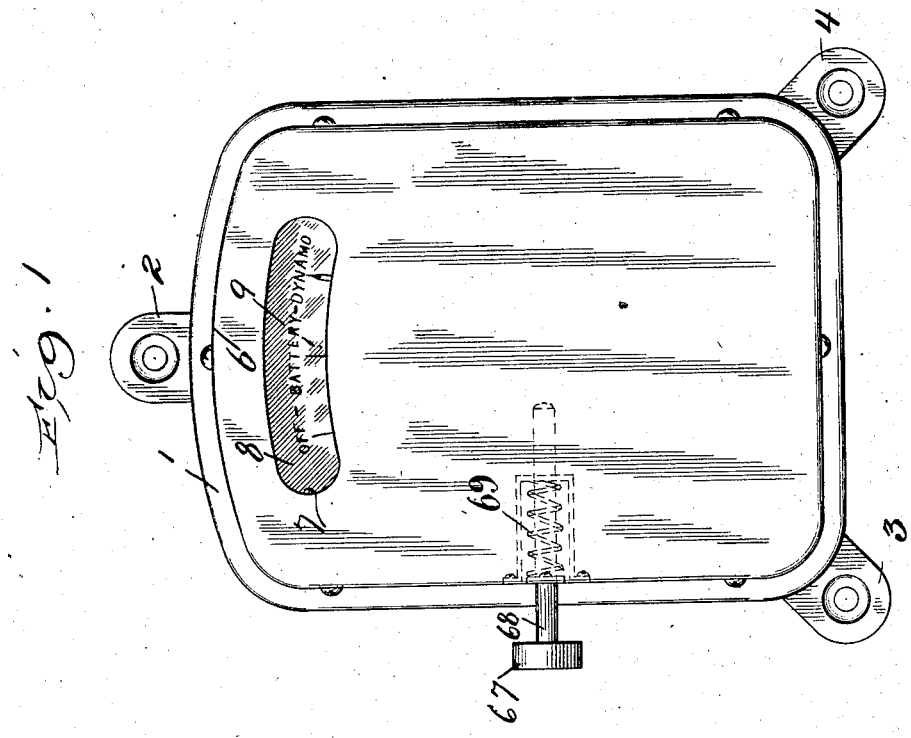
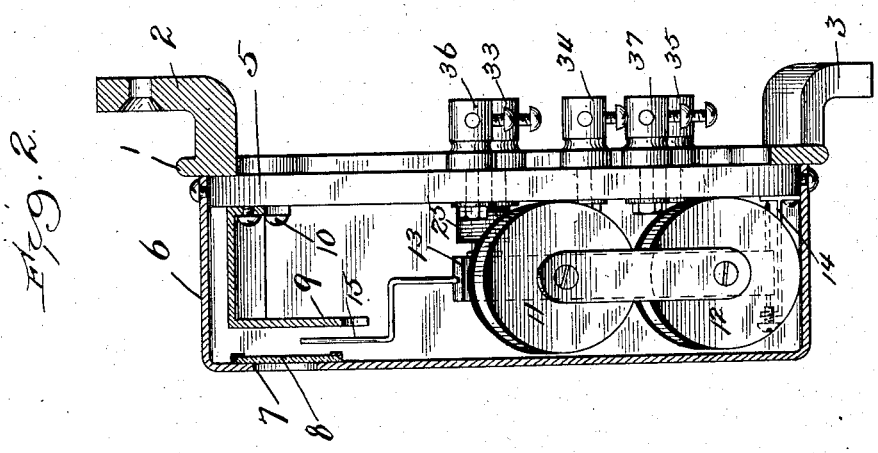

No. 727,567. PATENTED MAY 12, 1903.
V. G. APPLE.
ELECTRIC SWITCH.
APPLICATION FILED JUNE 16, 1902.
NO MODEL. 3 SHEETS—SHEET 2.
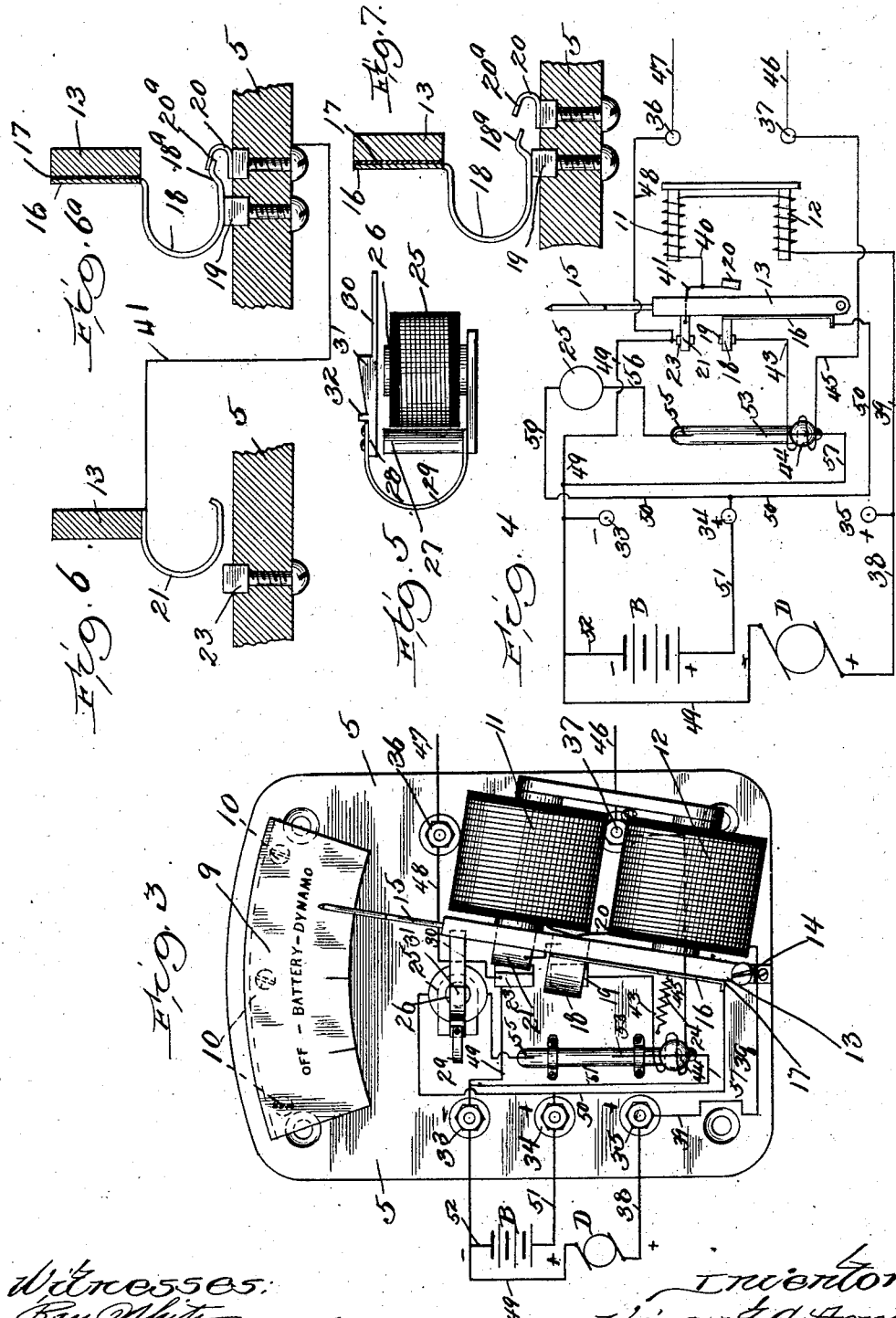

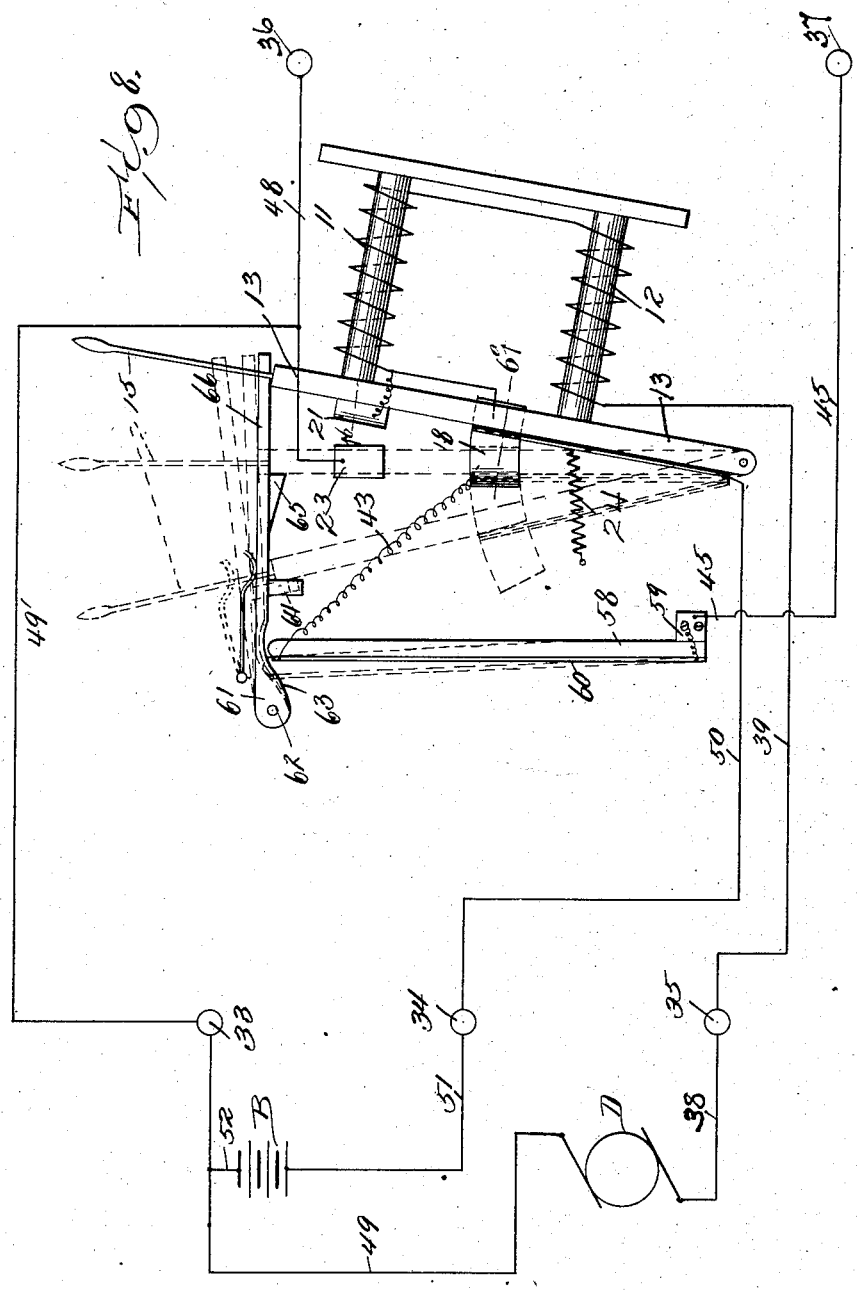

No. 727,567.

Patented May 12, 1903.

UNITED STATES PATENT OFFICE.

VINCENT G. APPLE, OF DAYTON, OHIO.

ELECTRIC SWITCH.

SPECIFICATION forming part of Letters Patent No. 727,567, dated May 12, 1903.

Application filed June 16, 1902. Serial No. 111,855. (No model.)

*To all whom it may concern:*

Be it known that I, VINCENT G. APPLE, of Dayton, in the county of Montgomery and State of Ohio, have invented certain new and useful Improvements in Electric Switches; and I hereby declare that the following is a full, clear, and exact description thereof, reference being had to the accompanying drawings, which form part of this specification.

My invention relates generally to improvements in electric switches of that class which are designed to be used in connection with charging dynamos and storage batteries.

My present invention relates to a switch that is arranged to automatically indicate the relation of the dynamo and the batteries in the circuit in which they are contained.

The object of my invention is to provide a switch which is adapted to be contained in a circuit common to a primary source of current, such as a dynamo, and a circuit from a secondary source of current, such as a primary or secondary battery, and arranged to automatically switch or shift the respective circuits with reference to each other and with reference to a third circuit containing translating devices, the switch being arranged to automatically indicate the condition of the respective circuits with reference to each other and with reference to the two sources of current which supply energy for the circuit containing the translating devices.

My invention is especially applicable to dynamos and storage batteries when used jointly and separately in connection with gas-engines for the purpose of producing electric-current energy for making the spark within the cylinder of such engines.

With these and other objects in view, which may become apparent to those skilled in the art, my invention consists of the features, arrangements, and associations of the circuits, devices, and parts, as will be hereinafter described, and particularly pointed out in the appended claims.

In the drawings, Figure 1 is a front elevation of my indicating-switch inclosed in the casing as it appears when in operation. Fig. 2 is a central vertical section through Fig. 1. Fig. 3 is an elevation of the switch with the casing removed, showing the parts, the circuits, and the diagrammatic representation of a dynamo, the primary source of energy, and a primary or storage battery, the secondary source of energy. Fig. 4 is a diagrammatic representation of the switch with the circuits, dynamo, and battery associated therewith. Fig. 5 is a detail view of the automatic relief-magnet. Figs. 6 and 6ª are sections through the armature on lines 6 6 and 6ª 6ª, respectively showing the contacts adapted to be connected therewith. Fig. 7 is a section through the armature similar to that shown in Fig. 6ª, showing the spring-contact carried by the armature and the stationary contact separated. Fig. 8 is a diagrammatic representation of the device, dynamo, battery, and circuit, showing a modification of a thermoelectric means by which the switching mechanism may be automatically and directly operated.

In all of the views the same reference letters and numerals indicate similar parts.

In the switch, 1 represents a base having legs 2, 3, and 4 by which the device may be attached to a support.

5 is a plate, preferably of insulating material, fixed to the said base and upon which the terminals of the switch and the various operative parts thereof are attached.

6 is a casing providing a cover adapted to surround the base and to inclose the parts mounted on the insulated base, having a crescent-shaped aperture 7, closed by a transparent plate 8, such as glass, mica, or the like.

A scale or insulating-support 9 is erected upon the plate 5 and attached thereto by the screws 10, which confronts the opening 7 and has upon its exposed surfaces such indications as may be desirable to show when the switch is in operation. In this instance on the extreme left the word "Off" is placed and on the extreme right the word "Dynamo," and intermediate of the two indications the word "Battery."

An electromagnet composed of the coils 11 and 12 is fixed to the base-plate 5. Confronting the poles of this magnet is a responsive armature 13, pivoted at one end 14, and carrying an index 15 upon its free end, which is adapted to sweep over the scale of the plate 9. An electric conducting-strip 16 is insulated from the armature 13 by means of a mica or other insulating plate 17. There is carried by the armature on the end farthest removed from the pivot a contact brush or spring 18. (Shown more plainly in Fig. 6ª and in Fig. 7.) This contact moves with the armature and is adapted to make electrical connection with the stationary contacts 19 and 20. A similar contact-spring 21 is also fixed directly to the armature and moves with it and is adapted to make electrical connection with the stationary contact 23. A spiral spring 24 is fixed to the armature and to a stationary point on the insulating-plate 5 and is adapted to hold the armature against the action of the electromagnet composed of the coils 11 and 12.

25 is an armature-releasing electromagnet provided with the poles 26 and 27. An armature 28 is responsive to the said magnet and is adapted to be moved vertically in front of the poles 26 and 27 when the electromagnet is energized. A spring 29 normally holds the armature removed from the salient poles of the magnet. The armature 13 rides over the extended free end 30 of the releasing-armature 28 when the armature 13 is attracted to the electromagnet composed of the coils 11 and 12. When this electromagnet is not energized, the spring 24 pulls the armature 13 back into contact with the shoulder 31, formed upon the armature 28. When the electromagnet 25 is energized, the armature 28 is attracted and the armature 13 will then be moved back over the shoulder 31 by the spring 24 into contact with the stop 32. Terminal binding-posts 33, 34, 35, 36, and 37 are fixed to the plate 5 and are adapted to connect the switch parts with the various circuits with which it is designed to be associated. A thermostat 38ª is adapted to automatically close a circuit through the magnet 25, for the purpose of opening the main circuit when the circuit including the translating devices is closed for a period of time longer than it is required for the operation of the apparatus connected therein, in a manner to be hereinafter described.

B is a storage battery, diagrammatically shown in the various figures.

D is a dynamo (shown in the same manner) representing the primary and secondary or the two sources of electric energy. The respective polarities of the dynamo and batteries are preferably connected in the manner indicated in the various diagrams.

The circuits of the device are as follows: from the positive brush of the dynamo D to the terminals 35 over the wire 38, thence to the electromagnet-coil 12 over the wire 39, through the coils 11 and 12 to the contact 20. At this point the circuit branches over the wire 40 and to the brush 21 on the armature 13 over the wire 41. If the armature 13 is in the position shown in Fig. 3, then the brush 18 will be in electrical connection with contacts 19 and 20. The current will therefore pass to the brush 18 from the contact 20 through the wire 43, around the thermostat-bulb 44 through the wire 45 to the terminal 37, to the translating devices in the exterior circuit over the wire 46, returning over the wire 47 to the terminal 36 of the switch over the wire 48 to the contact 23, from contact 23 over the wire 49 to the dynamo, thus completing the circuit through the spark-making device that may be placed in the cylinder of a gas-engine or such other translating device as may be desired to be used in the exterior circuit composed of the wires 46 and 47. Now starting at contact 20, where the circuit branches, should the circuit be opened between the wires 46 and 47 then the direction of the current will be, provided the armature 13 is in the position shown in Fig. 3, from the contact 20 to the spring 18 over the conducting-plate 16 to the wire 50 to the terminal 34, thence to the positive side of the battery over the wire 51, through the battery to the wire 49 over the wire 52, then back to the dynamo, thus charging the storage battery while the circuit between the wires 46 and 47 is opened. Now should the armature be in the position shown in the diagram of Fig. 4—that is to say, when the edge of the armature 13 is held against the shoulder 31 of the releasing-armature 30—then connection between the spring 18 and the contact 20 is broken, as shown, and the circuit will then be from the battery alone through the sparking device, as follows: from the positive side of the battery over wire 51 to the terminal 34 over the wire 50 to the plate 16, through the brush 18 to the contact 19, through the wire 43 around the thermostatic device 44 over the wire 45 to the terminals 37 of the switch, through the wire 46 and such translating device as may be connected therein—such, for instance, as a spark-making device usually employed in the cylinders of a gas-engine—through the wire 47 to the terminal 36 over the wire 48 to the contact 23, over the wires 49 and 52 to the negative side of the battery B. At this time the circuit through the dynamo will be closed and the electromagnet composed of the coils 11 and 12, if energized by said dynamo, will attract the armature 13 and pull it into the position shown in Fig. 3, so that the dynamo will automatically bring itself into circuit with the sparking device and will proceed to afford the necessary energy for the sparking device and to charge the battery at the time when the circuit between the sparking-device terminals is opened. Supposing now for any reason that the circuit between the wires 46 and 47 should be permanently closed, as may be when the circuits are not positively opened when the engine is stopped, then the current passing over the circuits and over the wire which surrounds the thermostatic device 44 for a protracted period of time will heat the mercury contained in the thermostatic-bulb device, thereby expanding the mercury and raising the column 53 contained therein until it reaches the contact-point 55, which is sealed in the upper part of the tube exemplifying the thermostatic device, the circuit would then be completed as follows: from the terminal 34 over the wire 50 to the electromagnet 25, through the wire 56 to the thermostatic device, through the column of mercury 53 over the wire 57 to the contact with the wire 49, completing the circuit from the battery B through the thermostatic device and the electromagnet 25 energizing the latter, at which time the armature 25 will be drawn down, so that the armature 13 will pass freely over the shoulder 31 and the spring 24 will draw it into contact with the shoulder 32, provided on the armature 30. The spring 24 is fixed to the armature 13, causing the movement of the armature in the manner described, at which time electrical connection between the springs or brushes 21 and 18 and their respective contacts will be entirely broken and the circuits leading from the battery and dynamo will both be in like manner automatically opened. In this position the index 15, attached to the armature 13, will indicate "off," thus showing that all of the circuits are opened and that the circuit is therefore withdrawn or off. As a result of this arrangement the battery will not be run down or discharged when the circuit is inadvertently left closed. When the armature occupies the middle position shown in Fig. 4, the index 15, indicated "battery," which shows that the battery alone is being used for furnishing current for the sparking device, and when the index is in the position shown in Fig. 3, indicating "dynamo," it shows that the dynamo is furnishing the current from the sparking device and incidentally charging the storage battery at the same time. Thus the operator is clearly informed of the condition and operation of the various devices.

Instead of using an electromagnet 25 and a thermostat 44 for the purpose of releasing the armature 13 in order to open the circuit when the current has passed through the circuit for a period of time detrimental to the battery, dynamo, or other parts of the device or associated devices a heat-responsive mechanism may be used direct for effecting this purpose. One method by which this may be done is in the modification shown in diagram Fig. 8. In this diagram is shown one means by which the excessive heat due to the abnormally-prolonged flow of the electric current may be applied direct for the purpose of releasing the armature 13; but other means than that shown may be employed for this purpose without departing from the spirit of my invention, it not being limited to the single means shown.

An insulating-rod 58, having a high coefficient of expansion, such as gutta-percha, is fixed to a clip 59, that is made stationary on the base of the switch. To one side of the rod a conducting-clip 60, having a comparatively low coefficient of expansion, is intimately attached. The electric carrying capacity of this conducting-strip is purposely made small, so that a current passing over it for a protracted period of time will raise its temperature a material degree. A horizontal lever 61 is pivoted at the point 62 and is provided with an incline 63, the bottom of which rests upon the end of the rod 58. A depending shoulder 64, projecting from the lever 61, and a similar shoulder 65, somewhat in advance of the latter, is also fixed to the lever 61. The prolonged end of the lever 66 normally rests upon the free top end of the armature 13. The normal position of the vertical rod 58 is shown in full lines and the abnormal position, due to the distortion of the rod 58, caused by the heating effect of the current passing over the strip 60, is shown in dotted lines. If the electromagnets 11 and 12 were not energized, the armature 13 will rest normally against the shoulder 65 of the lever 61 and will be held in place by spring 24 and current will be furnished to the spark-interrupter by the battery B. For any reason should electric current pass over the strip 60 for a period of time longer than that necessary to operate the circuit-interrupter located within the cylinder of the engine, the strip 60, which is in circuit with the battery, will become abnormally heated by the prolonged passage of the current and cause the rod 58 to expand. Being restrained by the strip 60, it will be distorted toward the left, as shown in the diagram. The upper end of the rod will impinge upon the incline 63 of the lever 61 and raise the lever 61 to the position shown in dotted lines, at which time the shoulder 65, carried by the lever, will be raised out of the path of the armature 13, when the spring 24 will pull the armature 13 to the position (also shown in dotted lines) in which it rests against the depending shoulder 64, carried by the said lever. At this time all of the contacts adapted to be closed by the movement of the armature 13 will have been thereby opened. When the current ceases to pass through the strip 60, the strip will assume its normal temperature and the rod 58 will resume its normal position, (shown in full lines in Fig. 8;) but the armature 13 will remain in the extreme left-hand position (shown in dotted lines) until pressed into its vertical position by means of a push-button 67, which is shown in Fig. 1 and which is designed for this purpose. The shaft 68, connected with the push-button 67, is brought into contact with the side of the armature 13 and pushes it into a vertical position or into the position shown in Fig. 3, closing the dynamo-circuit. A spring 69 is designed to return the push-button 67 and shaft 68 to their normal positions (shown in Fig. 1) and to remove it from the path of excursions of the armature 13.

My switch device is designed especially to be used with automobiles, wherein it will be subjected to considerable vibration, and for this purpose I have designed a lock-contact (shown in Figs. 6ª and 7) in which the spring-arm 18 is bent downwardly at the end 18ª and makes a wedge contact with the U-shaped piece 20ª. The U-shaped piece 20ª maintains a downward pressure upon the spring 18 as a result of the incline end 18ª and causes it to maintain an increased and positive electrical connection with the contact-piece 19. The resilient yet positive tension between the contacts 18ª and 20ª as long as the armature is in the position shown in Fig. 6ª will remain positively in conductive relation, so that any vibration to which they may be subjected will not produce any depreciation of the surfaces in contact. When pressure is applied to the armature 13, the tendency of the contacts 18ª and 20ª are to wedge together and to coincidentally and forcibly press the brush 18 into electrical connection with the electrical contact 19, and by this means the surfaces of the various contacts are maintained in conductive relation more intimately than when the contacts are made by a more positive but unyielding means. Any vibration that might affect the instrument as a whole will simply tend to force the respective contacts into closer intimate relation. This is a very important feature of my device.

My invention is not limited by the exemplification presented herewith, as many modifications may be made without departing from the spirit and scope thereof.

Having described my invention, what I claim as new and useful, and desire to secure by Letters Patent of the United States, is—

1. The combination with an electric switch of the class described, of a dynamo, a battery, a circuit-interrupter in a circuit common to both, suitable circuits for electrically connecting said dynamo, battery, interrupter and switch, a device operatively responsive to an abnormally-prolonged flow of current in said electric circuit, and a means actuated thereby adapted to automatically open said switch.

2. The combination with an electric switch of the class described, of a dynamo, a battery, a circuit-interrupter in a circuit common to both, suitable circuits for electrically connecting said dynamo, battery, interrupter and switch, a thermoelectric device operatively influenced by an abnormally-prolonged flow of current in the circuit containing said interrupter, and a means actuated thereby adapted to automatically open said switch.

3. The combination with an electric switch of a dynamo, a battery, a circuit-interrupter in a circuit common to both, suitable circuits for electrically connecting said dynamo, battery, interrupter and switch, a spring for holding the switch-shifting parts in position to include the battery only in circuit with the circuit-interrupter, and an electromagnet energized by said dynamo and adapted to move said switch-shifting parts in position to place said battery and said circuit-interrupter in parallel circuit with respect to each other, and in series circuit with said dynamo.

4. The combination with an electric switch, of a dynamo, a battery, a circuit-interrupter in a circuit common to both, suitable circuits for electrically connecting said dynamo, battery, interrupter and switch, a spring for holding the switch-shifting parts in position to include the battery only in circuit with the circuit-interrupter, an electromagnet energized by said dynamo and adapted to move said switch-shifting parts in position to place said battery and said circuit-interrupter in parallel circuit with respect to each other and in series circuit with said dynamo, a current-time-responsive device adapted to be operated by an abnormally-prolonged flow of current, and a means actuated thereby for opening said switch.

5. The combination with an electric switch, of a dynamo, a battery, a circuit-interrupter common to both, suitable circuits for electrically connecting said dynamo, battery, interrupter, and switch, a means for holding the switch-shifting parts in position to include the battery in circuit with the interrupter, and a current-responsive motor in circuit with the dynamo adapted, when energized, to actuate said switch and thereby hold said dynamo in circuit with said interrupter.

6. The combination with an electric switch of a dynamo, a battery, a circuit-interrupter common to both, suitable circuits for electrically connecting said dynamo, battery, interrupter, and switch, a means for holding the switch-shifting parts in position to include the battery in circuit with the interrupter, a current-responsive motor in circuit with the dynamo, adapted, when energized, to actuate said switch and thereby hold said dynamo in circuit with said interrupter, a current-time-responsive device adapted to be operated by an abnormally-prolonged flow of current, and a means actuated thereby for opening said switch.

7. The combination with an electric switch of a dynamo, a battery, a circuit-interrupter common to both, suitable circuits for electrically connecting said dynamo, battery, interrupter, and switch, a means for holding the switch-shifting parts in position to include the battery in circuit with the circuit-interrupter, a current-responsive motor in circuit with the dynamo, adapted, when energized, to actuate said switch-shifting parts and thereby hold said dynamo in circuit with said interrupter, and a means for automatically opening said switch.

8. The combination with an electric switch of a dynamo, a battery, a circuit-interrupter common to both, suitable circuits for electrically connecting said dynamo, battery, interrupter, and switch, a means for holding the switch-shifting parts in position to include the battery in circuit with the circuit-interrupter, a current-responsive motor in circuit with the dynamo, adapted, when energized, to actuate said switch-shifting parts and thereby hold said dynamo in circuit with said interrupter, a means for automatically opening said switch and an index operated by the switch-shifting parts, for indicating the position of the switch.

In testimony that I claim the foregoing as my own I affix my signature in presence of two witnesses.

VINCENT G. APPLE.

In presence of—
H. TRONE,
JOHN H. TRANGENSTEIN.